United States Patent [19]

Molina

[11] Patent Number: 4,472,095

[45] Date of Patent: Sep. 18, 1984

[54] LOCKING FASTENER

[75] Inventor: Jorge W. Molina, Torrance, Calif.

[73] Assignee: Deutsch Fastener Corp., El Segundo, Calif.

[21] Appl. No.: 288,499

[22] Filed: Jul. 30, 1981

[51] Int. Cl.³ .............................................. F16B 39/24
[52] U.S. Cl. .................................. 411/304; 411/236; 411/247; 411/427; 411/430; 10/86 A
[58] Field of Search ............... 411/235, 236, 294, 316, 411/317, 301–304, 246, 247, 322–324, 360, 361, 365, 432, 430, 433, 427; 10/86 A

[56] References Cited

U.S. PATENT DOCUMENTS

| | | | |
|---|---|---|---|
| 1,624,764 | 4/1927 | Sale | 411/294 |
| 2,832,391 | 4/1958 | Clark | 411/303 |
| 3,550,668 | 12/1970 | Coyle | 411/302 |

FOREIGN PATENT DOCUMENTS 2333152  6/1977  France .................................. 411/303

OTHER PUBLICATIONS

Machine Design, 11/15/79, pp. 23–25 & 49.

Primary Examiner—Thomas J. Hocko
Assistant Examiner—Neill Wilson
Attorney, Agent, or Firm—Gausewitz, Carr, Rothenberg & Edwards

[57] ABSTRACT

This invention provides a locking fastener in which a nut is provided with symmetrical axial slots extending inwardly from one end, a sleeve surrounds the nut and has ribs in the slots for engaging the thread of a threaded shank received in the nut, and a tubular member extends around the sleeve for pressing the sleeve into an annular groove in the nut for retaining the sleeve on the nut. The ends of a tubular member are bent inwardly adjacent the ends of the sleeve for holding the tubular member on the sleeve.

13 Claims, 5 Drawing Figures

U.S. Patent   Sep. 18, 1984   4,472,095
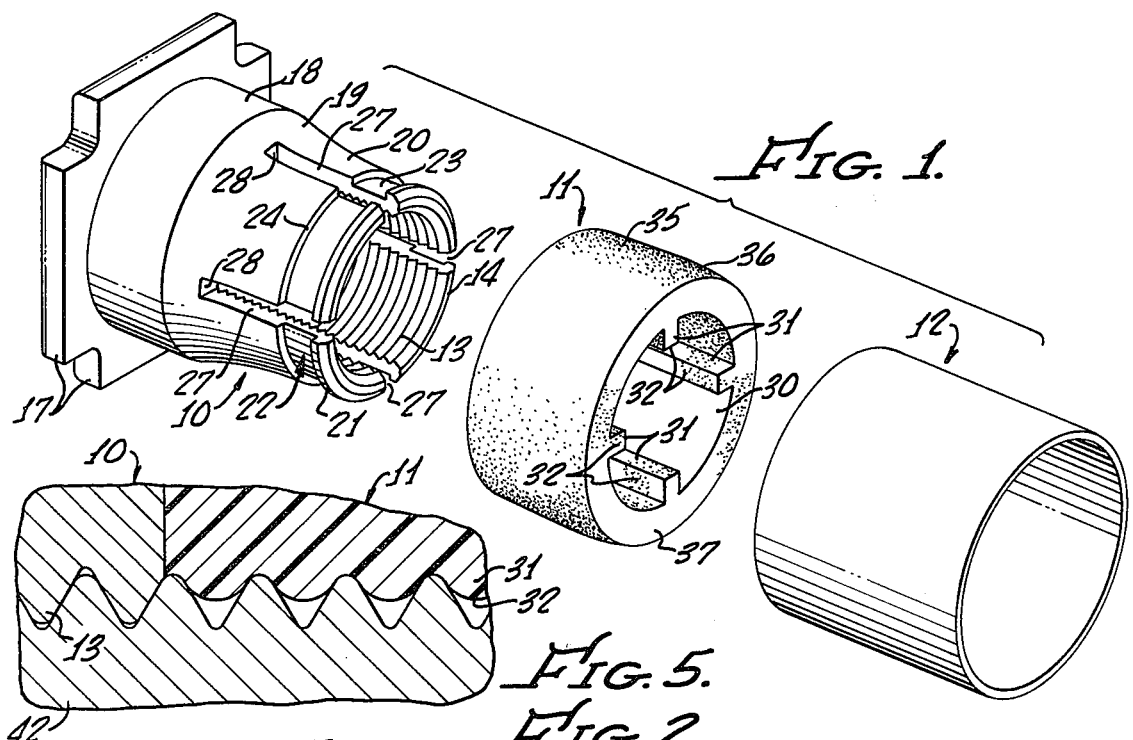
FIG. 1.
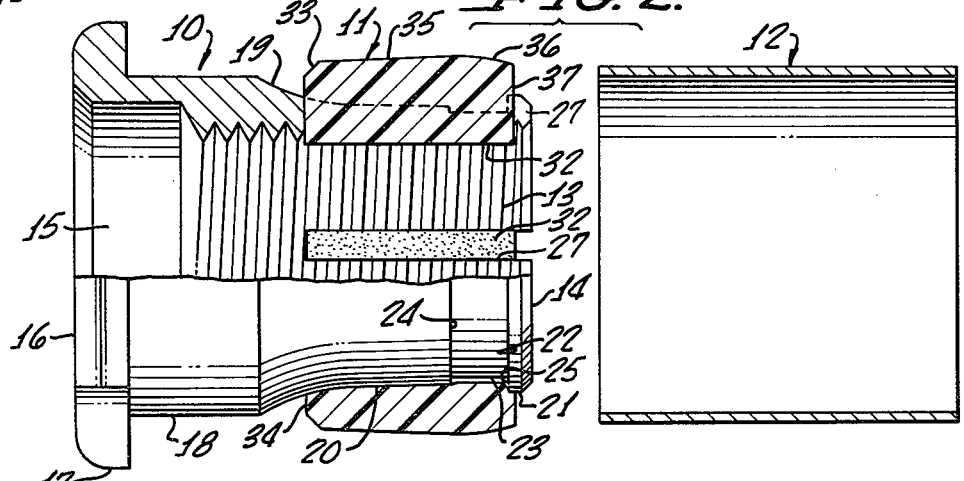
FIG. 5.
FIG. 2.
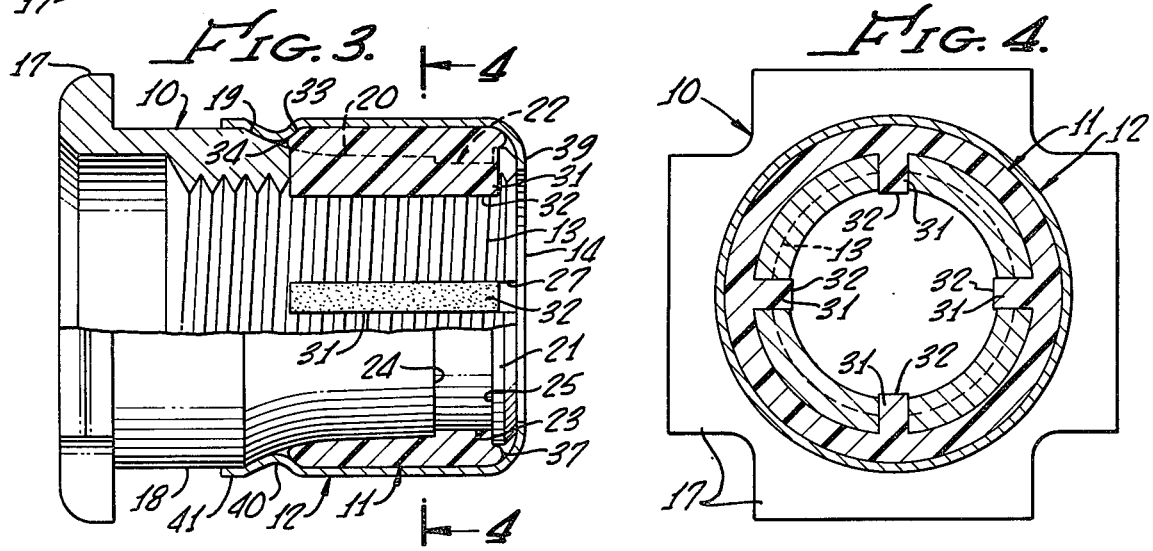
FIG. 3.   FIG. 4.

LOCKING FASTENER

BACKGROUND OF THE INVENTION

Locking fasteners are in widespread use and, particularly in the aerospace industry, must meet exacting performance standards. A common form of locking fastener, among several different types, uses a small plug of plastic material embedded in the wall of the bore of a nut for engagement with a bolt or stud that enters the nut. The plastic plug pushes the threaded shank to the opposite side of a nut causing the threads of the shank and of the nut to be pressed together at that location. The result is a frictional effect to prevent undesired loosening of the nut.

This system has its drawbacks, particularly in the area of repeatability. That is to say, the small plastic plug rapidly wears out upon repeated cycles of mating and unmating of the nut and the threaded shank, soon losing its ability to exert a substantial lateral force on the shank. The ability to lock the nut against loosening becomes lost. Then it becomes necessary to discard the nut, because it will not remain secured under vibrational loads.

Another form of locking nut has employed a ring of material around one end of the nut, but again the material has worn out rapidly and the locking effect soon vanishes. Other locking fasteners rely upon an out-of-round threaded bore, a resilient clamping force on the threaded shank or a distorted thread configuration. Adequate thread locking force, repeatability, and manufacturing cost have presented problems for these and other locking fasteners.

SUMMARY OF THE INVENTION

The present invention provides an improved locking nut with increased retention force and enhanced repeatability. The nut can be mated and unmated with a stud or bolt many cycles without loss of the retention effect. The possibility of loosening under vibrational load is negligible.

The improved results are accomplished by a nut that includes symmetrically arranged slots extending in from its outer end interrupting the thread of the bore of the nut. A sleeve of plastic material, such as polyester, fits around the nut with ribs extending into the slots in the nut. A tubular housing fits around the plastic sleeve. The sleeve makes a force fit within the housing causing the sleeve to be deflected inwardly into a circumferential groove on the periphery of the nut. The walls of the groove, together with the ribs and the walls of the slots, lock the sleeve on the nut. The ends of the tubular housing are deflected inwardly around the ends of the plastic sleeve, retaining the tubular housing to the nut.

The ribs of the plastic sleeve provide a large area of contact with the threads of the bolt or stud, causing a binding effect on a substantial length of the shank, which is symmetrical around its periphery. By having an increased area, it is unnecessary to engage more than the tips of the thread on the shank, which reduces the wear on the locking elements. Thus, it is the cumulative effect of several ribs that produces the thread locking, and it is not necessary to obtain all of the locking action from a single plug or annular ring. The reduced wear results in the greatly improved repeatability of the locking effect.

In addition to effectively locking on a threaded shank, the nut is easily and economically manufactured and can be handled as any conventional nut.

DESCRIPTION OF THE DRAWINGS

FIG. 1 is a perspective view of the components of the locking fastener of this invention prior to assembly;

FIG. 2 is a longitudinal sectional view of the fastener, partially in elevation, with the plastic sleeve fitted on the nut;

FIG. 3 is a view similar to FIG. 2, but with the housing positioned over the plastic sleeve to complete the assembly;

FIG. 4 is a transverse sectional view, taken along line 4-4 of FIG. 3; and

FIG. 5 is an enlarged fragmentary sectional view showing how the locking effect is achieved.

DETAILED DESCRIPTION OF THE PREFERRED EMBODIMENT

The locking fastener of this invention includes a nut 10, a sleeve 11, and a housing 12. The nut 10 includes a threaded bore 13 extending inwardly from one end 14 and a counterbore 15 at the opposite end 16. Exteriorally, the nut includes a flange 17 at the base end 16 to engage the slotted walls of a conventional basket that keeps the nut from rotating when the basket is attached to a workpiece. Inwardly of the flange 17 is a cylindrical part 18. Beyond the surface 18 is an inwardly curved, tapered part 19 that connects to a surface 20 that tapers at a more shallow angle toward the end 14. An exterior annular flange 21 is at the end 14, and there is an annular groove 22 is between this flange and the surface 20. The inner wall 23 of the groove 22 is cylindrical, and the side edges 24 and 25 of the groove are radial. The latter edge is defined by the inner wall of the flange 21, and is of greater height than that of the groove edge 24. Four equally spaced identical slots 27 through the wall of the nut extend axially inwardly from the end 14 to the intermediate part of the nut. The slots 27 have parallel side walls, and their inner end edges 28 extend circumferentially at the narrower part of the tapered surface 19. As a result, the slots 27 interrupt the thread of the bore 13, terminating at the intermediate portion of the thread.

The sleeve 11 has a cylindrical inner wall 30 which is interrupted by four parallel, axially extending ribs 31 which extend the full length of the sleeve and have flat inwardly facing longitudinal surfaces 32. The ribs 31 are equally spaced apart and dimensioned to fit substantially complementarily between the sidewalls of the slots 27 of the nut. The sleeve is made of a generally rigid but deformable plastic material, preferably polyester.

Exteriorally, the sleeve 11 includes a beveled outer edge 33 at one end 34. The intermediate exterior surface 35 tapers at a shallow angle to the bevel 33. The surface 35 fares smoothly into a shorter surface 36 that tapers to the opposite end 37 of the sleeve.

The housing 12 is a thin-walled metal tube that is longer than the sleeve 11, but shorter than the nut 10.

In assembling the fastener, first the sleeve 11 is fitted over the nut 10 adjacent the end 14 of the nut. As this takes place, the four ribs 31 on the sleeve 11 slide into the slots 27 and abut the end edges 28 of the slots in the final position. This locates the sleeve 11 axially relative to the nut 10 and prevents relative rotation of the sleeve and nut. It is necessary to expand the sleeve slightly as it moves over the flange 21 of the nut and as its inner wall is deflected outwardly by the tapered surfaces 19 and 20. The end 34 of the sleeve 11 goes on first so that the sleeve end 37 is adjacent the flange 21 of the nut.

Next the sleeve 11 is compressed circumferentially allowing the housing 12, which has a smaller inside lateral dimension than that of the free diameter of the sleeve 11, to be moved over the sleeve. The tubular housing 12 confines the sleeve 11, causing the sleeve 11 to assume a cylindrical exterior configuration and to be pressed tightly against the inner wall of the sleeve and the outer surfaces 19 and 20 of the nut. The compression of the sleeve 11 by the housing 12 also causes the inner wall of the sleeve to be deflected into the groove 22 of the nut.

The housing 12 extends axially beyond both ends 34 and 37 of the sleeve. One end of the housing 12 is deflected inwardly toward the axis so as to overlie the end 14 of the nut 10 and the end 37 of the sleeve 11. This provides the housing 12 with an inwardly directed flange 39. Axially inwardly of its opposite end, the housing is deflected inwardly to provide an annular constriction 40 adjacent the end 34 and beveled edge 33 of the sleeve 11. At the constriction 40 the wall of the housing 12 overlies a portion of the surface 19 of the nut. Beyond the constriction 40, the end part 41 of the sleeve fits complementarily over a portion of the cylindrical surface 18 of the nut.

By this arrangement, both the housing 12 and the sleeve 11 are retained on the nut 10. The sleeve 11 cannot move axially, because it is deflected by the housing 12 into the annular groove 22 of the nut. The primary retention is accomplished by the side edge 25 of the groove, which is the inner wall of the flange 21, acting as an abutment and preventing the sleeve 11 from moving outwardly off the nut. In addition, the ends of the ribs 21 engage the abutments provided by the inner ends 28 of the slots 27, which holds the sleeve 11 against axial movement in the opposite direction. The housing 12, in turn, is prevented from movement by the end flange 39 and the constriction 40. The end flange 39 overlies the nut end 14 and sleeve end 37 to prohibit movement of the housing 12 to the left, as illustrated, toward the end 16 of the nut. The constriction 40 locks the housing 12 against movement axially in either direction by engaging the tapered surface 19 and the end part of the sleeve 11. Therefore, the sleeve 11 is held to the nut, and the housing 12 is held to the sleeve.

In the assembled fastener, the inner longitudinal surfaces 32 of the ribs 31 extend into the thread of the threaded bore 13. Consequently, when a bolt 42 is screwed into the nut (FIG. 5), the crest of its thread engages the surfaces 32 of the ribs 31, and it is necessary for the bolt thread to deflect the material of the ribs as advancement of the bolt takes place. This causes the ribs to press against the thread of the bolt, generating friction to create a locking action which resists withdrawal of the bolt when the fastener is in service. Irrespective of vibrational loads, the nut will not loosen on the bolt.

The bolt can be started easily in the nut, because the slots 27, and hence the ribs 31, do not extend all the way to the beginning of the threaded bore 13. Only after the bolt and nut have meshed does the engagement with the locking ribs occur. In this locking fastener, with the thread of the bolt being engaged by four ribs, there is a large amount of area engagement between the ribs and the thread. The ribs are equally spaced around the bolt, maintaining symmetrical locking frictional forces around the bolt shank and resulting in a very effective locking action with the bolt shank axially centered in the nut. Because of the large area of contact with the bolt, it is unnecessary for the locking ribs to engage the bolt thread along the full dimensions of its flanks. In other words, the locking ribs engage only the crest portions of the bolt thread, and the bolt thread does not extend deeply into the ribs. This minimizes the wear on the ribs, giving the fastener a high degree of repeatability. The locking effect will be retained even after many cycles of mating and unmating the bolt and nut.

The foregoing detailed description is to be clearly understood as given by way of illustration and example only, the spirit and scope of this invention being limited solely by the appended claims.

What is claimed is:

1. A locking fastener comprising
a nut having a threaded bore, and a plurality of slots extending axially inwardly from one end and interrupting the thread of said threaded bore,
said slots being symmetrical around the axis of said bore, a sleeve of deflectable, friction-producing material around the exterior of said nut,
said sleeve including ribs in said slots and extending into the
thread of said threaded bore for engagement with a threaded
member meshed with said thread of said threaded bore, and means for retaining said sleeve on said nut said nut further including abutment means acting to prevent any axial movement of the sleeve.

2. A locking fastener comprising
a one-piece member having a continuous annular part at one end, a threaded bore, and a plurality of slots therethrough extending axially inwardly from the opposite end and interrupting thread of said threaded bore,
said slots being symmetrical around the axis of said bore, a sleeve of deflectable, friction-producing material around the exterior of the slotted portion of said member,
said sleeve including an axial rib in each of said slots and extending into the thread of said threaded bore for engagement with a threaded member meshed with said thread of said threaded bore,
and means extending around said sleeve and confining the same, said one-piece member having abutment means engaged by said sleeve for thereby preventing any axial movement of said sleeve relative to said member.

3. A device as recited in claim 2 in which there are four of said slots equally angularly spaced apart, said sleeve including a rib in each of said slots.

4. A device as recited in claim 3 in which said ribs extend the full length of said sleeve.

5. A device as recited in claim 3 in which said ribs present flat longitudinal surfaces facing toward the axis of said threaded bore.

6. A locking fastener comprising
a nut having a threaded bore, and a plurality of slots extending axially inwardly from one end and interrupting the thread of said threaded bore,
said slots being symmetrical around the axis of said bore, a sleeve of deflectable, friction-producing material around the exterior of said nut, said sleeve including ribs in said slots and extending into the thread of said threaded bore for engagement with a threaded member meshed with said thread of said threaded bore, and means for retaining said sleeve on said nut including a member around said sleeve confining said sleeve and pressing said sleeve radially inwardly, said nut having recess means on the exterior thereof, said sleeve being deflected by said member into said recess means so that said nut at said recess means prevents said sleeve from moving axially relative to said nut.

7. A device as recited in claim 6 in which said recess means is an annular groove.

8. A device as recited in claim 7 in which said nut at said annular groove provides a flange at the edge of said groove adjacent said one end so as to provide resistance to movement of said sleeve outwardly in the direction of said one end, in which said slots terminate at inner ends, and said ribs engage said inner ends of said slots for resisting movement of said sleeve toward said opposite end of said nut.

9. A device as recited in claim 8 in which one wall of said flange defines the edge of said annular groove adjacent said one end, said edge of said annular groove being higher than the opposite edge thereof.

10. A locking fastener comprising a nut having a threaded bore, and a plurality of slots extending axially inwardly from one end and interrupting the thread of said threaded bore, said nut including a first part of relatively wide exterior dimension, a second part of relatively narrow exterior dimension, and a third part intermediate said first and second parts, said slots being symmetrical around the axis of said bore, a sleeve of deflectable, friction-producing material around the exterior of said nut, said sleeve being on said second part of said nut and including ribs in said slots and extending into the thread of said threaded bore for engagement with a threaded member meshed with said thread of said threaded bore, and means for retaining said sleeve on said nut including a tube deflected inwardly at said third part to engage one end portion of said sleeve for retaining said tube on said sleeve.

11. A device as recited in claim 10 in which said third part of said nut is tapered from said first part to said second part, said tube engaging said third part beyond said end of said sleeve.

12. A device as recited in claim 11 in which said tube is deflected inwardly at said one end of said nut so as to overlie the opposite end portion of said sleeve.

13. A device as recited in claim 2 in which said means extending around said sleeve is a tubular member.

* * * * *